Figure 1:
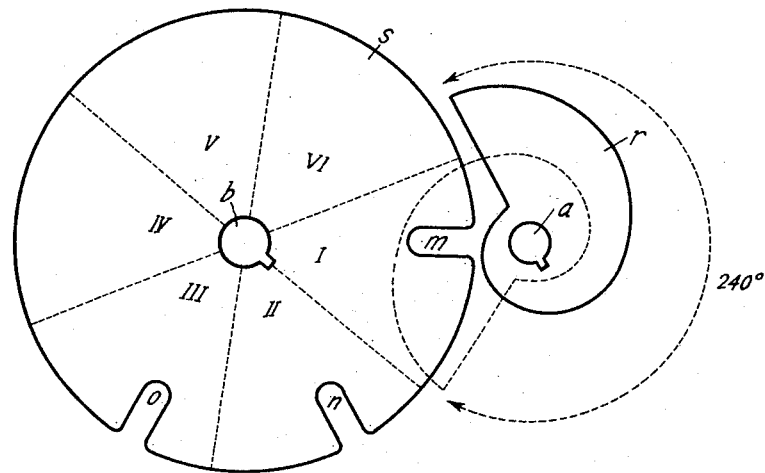
Figure 1:
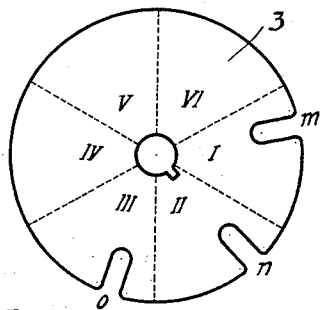
Figure 1:
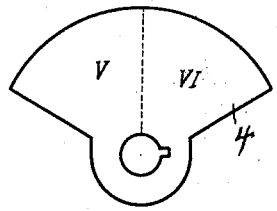
Figure 1:
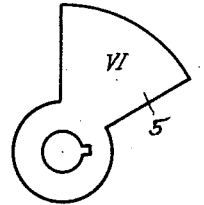
Figure 1:
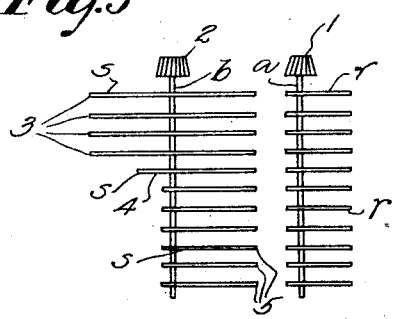
Figure 1:
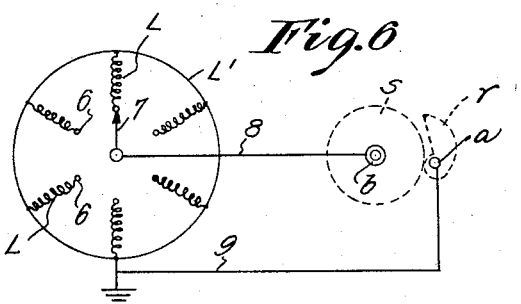

April 18, 1933.  E. MULLNER  1,904,165

VARIABLE CONDENSER

Filed Feb. 10, 1930

*Fig. 2*    *Fig. 3*    *Fig. 4*

*Fig. 5*    *Fig. 6*

INVENTOR
EDMUND MULLNER
BY
ATTORNEY

Patented Apr. 18, 1933

1,904,165

UNITED STATES PATENT OFFICE

EDMUND MULLNER, OF BERLIN, GERMANY, ASSIGNOR TO TELEFUNKEN GESELLSCHAFT FUR DRAHTLOSE TELEGRAPHIE M. B. H., OF BERLIN, GERMANY, A CORPORATION OF GERMANY

VARIABLE CONDENSER

Application filed February 10, 1930, Serial No. 427,111, and in Germany February 18, 1929.

My present invention relates to condensers, and more particularly to rotating plate condensers for various frequency ranges, particularly to be used with wave or frequency meters.

The reading of the present wave or frequency meters provided with a switch for various measuring ranges is cumbersome, since equal divisions on the scales for the various frequency ranges do not correspond to equal frequency differences.

This present invention simplifies the reading by providing a rotating plate condenser for various frequency ranges in which the number and section of the stator plates acting in coordination with the rotor plates are so chosen that an equal rotor displacement in the various frequency ranges corresponds to an equal frequency difference. Each rotor preferably has a section for linear frequency variation, whereas the stationary plate system (stator) is provided with segments, the number and section of which are so selected for every frequency range that, by their insertion, an angular unit displacement of the rotor is made to indicate a constant frequency change in each of the various frequency ranges.

The novel features which I believe to be characteristic of my invention are set forth in particularity in the appended claims, the invention itself, however, as to both its organization and method of operation will best be understood by reference to the following description taken in connection with the drawing in which I have indicated diagrammatically an arrangement whereby my invention may be carried into effect.

In the drawing,

Fig. 1 is a plan view, in diagrammatic manner, of a condenser embodying the invention, Fig. 2 is a plan view of the upper stator plate, Fig. 3 is a plan view of the single intermediate stator plate, Fig. 4 is a plan view of one of the lower stator sectors, Fig. 5 shows diagrammatically a front elevation of the condenser of Fig. 1, Fig. 6 is a circuit diagram of a tuning circuit embodying the invention.

The following detailed description of the application of such a rotating plate condenser for a wave meter of six stages with a total measuring range from 100 to 1000 kilocycles is to be considered with regard to the drawing. Each stage may have a scale of one hundred equal divisions covering a total range of 150 kilocycles. Thus, each division of the scale corresponds to a frequency difference of 1.5 kilocycles. The condenser, shown in Figs. 1 and 5, consists of a set of rotating plates $r$ (rotor) mounted on a shaft $a$, the plates having a section adapted to a linear change of frequency, and of a set of stationary plates $s$ forming the stator and mounted on the shaft $b$. The stator may be fixed in six different positions corresponding to the six measuring ranges. The rotor in this case may be turned through an angle of 240 degrees.

Let us assume that this angle of 240° is divided into 120 parts of which the section between the 10th and 110th division, comprising 100 divisions, may constitute the active measuring range. Thus, every scale has 100 divisions within its active measuring range. Furthermore, the knob 1 of the rotating set may be equipped with a nonius making possible an exact reading to $\frac{1}{10}$ of each division of the scale. The stator by means of a knob 2 may be shifted to six various fixed positions 60° apart corresponding to the six measuring ranges. The position of the stator, as shown in Fig. 1, corresponds to the first measuring range. For each successive measuring range the stator must be turned 60°, counterclockwise in this case.

When shifting to another measuring range the value of the self-induction must be changed simultaneously with the shifting of the stator. The self-induction remains constant within each measuring range, the capacity varying from a minimum to a maximum during the turning of the rotor within the active measuring range.

The required maximum capacity values vary with the different measuring ranges.

Suppose the spacing of the rotating plates is made so that in stage VI, (i. e., in the range of the lower frequencies and longer waves) the required capacity variation of, say, 100 cm., to 625 cm., may be obtained by a set of 10 plates. With properly selected self-induction in the other stages it is then necessary to have the following active areas or number of condenser plates in order to obtain the corresponding maximum capacities C:

Stage I C=139 cm.=2.22 movable plates and 4 stationary plates.
Stage II C=147 cm.=2.35 movable plates and 4 stationary plates.
Stage III C=162 cm.=2.6 movable plates and 4 stationary plates.
Stage IV C=188 cm.=3 movable plates and 4 stationary plates.
Stage V C=256 cm.=4 movable plates and 5 stationary plates.
Stage VI C=625 cm.=10 movable plates and 11 stationary plates.

Since the set of 10 movable plates does not change it is necessary to select the stator plates as follows:

(a) 4—Plates for which (Plates 3 in Fig. 5) segment I to be inserted in stage I must be reduced about 13%; segment II to be inserted in stage II must be reduced about 10.9%; segment III to be inserted in stage III must be reduced about 7%; segments IV, V and VI (Figs. 1 or 2) remaining full. The required reductions of the active areas of segments I, II and III are obtained most conveniently by cuts $m$, $n$ and $o$ of suitable width.

(b) 1—Plate (Fig. 3) which contains segments for stage V and VI only, (Plate 4 in Fig. 5).

(c) 6—Plates (Fig. 4) which have a segment for stage VI only, (Plates 5 in Fig. 5).

The described rotating plate condenser with an equal, frequency-true scale or dial for all stages may be used to advantage not only for wave meters, but for various other multi-stage oscillatory circuits susceptible to switching-over, for instance for transmitters and receivers.

In Fig. 6 there is shown a circuit diagram of a tuning circuit embodying the set of stator plates $s$ and the rotor set $r$. Six inductances L are provided, a terminal of each inductance being connected to a common lead L', each remaining terminal being connected to a contact 6. A contact arm 7, coupled mechanically to the stator shaft 6 by any desired means 8, is actuated to function as a range change-over switch whenever the knob 2 (Fig. 5) is moved from range to range. The lead L' is grounded, and a conductor 9 connects the rotor shaft $a$ to the grounded lead L'. It will be understood that the inductance L in each range is so chosen that in conjunction with the initial capacity of the condenser, with the rotor at the minimum setting of its operating range, there is obtained resonance at the maximum resonance frequency obtained from the preceding range with the rotor at the maximum setting of its operating range.

While I have indicated and described one system for carrying my invention into effect, it will be apparent to one skilled in the art that my invention is by no means limited to the particular organization show and described, but that many modifications in the circuit arrangements, as well as in the apparatus employed, may be made without departing from the scope of my invention as set forth in the appended claims.

What I claim is:

1. A variable condenser, adapted for use in a multi-frequency range oscillation circuit, comprising a plurality of stator groups, one of said groups including a plurality of spaced circular plates, a second of said groups including a plurality of spaced plates, the plates of the second group being segments of the plates of the first group, and at least one stator plate spaced from both said groups having an area different from the plates of both said groups, means for mounting all of said stator plates for rotation about a common axis to effect said multi-range operation, a plurality of rotor plates, of a common area, interleaved with said stator plates, and means for mounting said rotor plates for rotation about a common axis.

2. A variable condenser, adapted for use in a multi-frequency range oscillation circuit, comprising a plurality of stator groups, one of said groups including a plurality of spaced circular plates of the same area, a second of said groups including a plurality of spaced plates, the plates of the second group being segments of the plates of the first group, and at least one stator plate spaced from both said groups having an area different from the plates of both said groups, means for mounting all of said stator plates for rotation about a common axis to effect said multi-range operation, a plurality of rotor plates, of a common area, interleaved with said stator plates, and means for mounting said rotor plates for rotation about a common axis.

3. A variable condenser, adapted for use in a multi-frequency range oscillation circuit, comprising a plurality of stator groups, one of said groups including a plurality of spaced circular plates, a second of said groups including a plurality of spaced plates, the plates of the second group being segments of the plates of the first group, and at least one stator plate spaced from both said groups having an area intermediate the plates of both said groups, means for mounting all of said stator plates for rotation about a common axis to effect said multi-range operation, a plurality of rotor plates, of a common area, interleaved with said stator plates, and means for mounting said rotor plates for rotation about a common axis.

4. A multi-frequency range oscillation circuit comprising in combination with a plurality of inductance coils, a variable condenser consisting of a plurality of stator groups, one of said groups including a plurality of spaced circular plates, a second of said groups including a plurality of spaced plates, the plates of the second group being segments of the plates of the first group, and at least one stator plate spaced from both said groups having an area different from the plates of both said groups, means for mounting all of said stator plates for rotation about a common axis to effect said multi-range operation, a plurality of rotor plates, of a common area, interleaved with said stator plates, and means for mounting said rotor plates for rotation about a common axis, means for connecting said rotor plates to a common terminal of said coils, and additional means for selectively connecting said stator plates to a terminal of a predetermined one of said coils when said stator rotating means is adjusted.

5. A multi-frequency range oscillation circuit comprising in combination with a plurality of inductance coils, a variable condenser consisting of a plurality of stator groups, one of said groups including a plurality of spaced circular plates of the same area, a second of said groups including a plurality of spaced plates, the plates of the second group being segments of the plates of the first group, and at least one stator plate spaced from both said groups having an area different from the plates of both said groups, means for mounting all of said stator plates for rotation about a common axis to effect said multi-range operation, a plurality of rotor plates, of a common area, interleaved with said stator plates, and means for mounting said rotor plates for rotation about a common axis, means for connecting said rotor plates to a common terminal of said coils, and additional means for selectively connecting said stator plates to a terminal of a predetermined one of said coils when said stator rotating means is adjusted.

6. A multi-frequency range oscillation circuit comprising in combination with a plurality of inductance coils, a variable condenser consisting of a plurality of stator groups, one of said groups including a plurality of spaced circular plates, a second of said groups including a plurality of spaced plates, the plates of the second group being segments of the plates of the first group, and at least one stator plate spaced from both said groups having an area intermediate the plates of both said groups, means for mounting all of said stator plates for rotation about a common axis to effect said multi-range operation, a plurality of rotor plates, of a common area, interleaved with said stator plates, and means for mounting said rotor plates for rotation about a common axis, means for connecting said rotor plates to a common terminal of said coils, and additional means for selectively connecting said stator plates to a terminal of a predetermined one of said coils when said stator rotating means is adjusted.

EDMUND MULLNER.